United States Patent [19]

Mori et al.

[11] Patent Number: 5,053,271

[45] Date of Patent: Oct. 1, 1991

[54] SKIN COVERED FOAMED PLASTIC ARTICLE

[75] Inventors: Masami Mori; Norio Yanagishita, both of Ayase, Japan

[73] Assignee: Ikeda Bussan Co., Ltd., Kanagawa, Japan

[21] Appl. No.: 429,234

[22] Filed: Oct. 27, 1989

[30] Foreign Application Priority Data

Oct. 31, 1988 [JP] Japan ............................ 63-142209[U]
Oct. 31, 1988 [JP] Japan ............................ 63-142210[U]
Oct. 31, 1988 [JP] Japan ............................ 63-142211[U]

[51] Int. Cl.⁵ ............................................... B32B 3/26
[52] U.S. Cl. ............................... 428/304.4; 428/316.6; 428/317.1
[58] Field of Search ................. 428/304.4, 316.6, 317.1

[56] References Cited

FOREIGN PATENT DOCUMENTS

| | | |
|---|---|---|
| 859947 | 1/1961 | United Kingdom . |
| 959848 | 6/1964 | United Kingdom . |
| 1023880 | 3/1966 | United Kingdom ............. 428/316.6 |
| 1222711 | 2/1971 | United Kingdom . |
| 1423817 | 2/1976 | United Kingdom . |
| 1427619 | 3/1976 | United Kingdom . |
| 1458664 | 12/1976 | United Kingdom . |
| 2002675 | 2/1979 | United Kingdom ............. 428/317.1 |
| 1595794 | 8/1981 | United Kingdom ............. 428/316.6 |
| 2114051 | 8/1983 | United Kingdom . |
| 2183470 | 6/1987 | United Kingdom . |
| 2198080 | 6/1988 | United Kingdom . |
| 2211781 | 7/1989 | United Kingdom . |
| 2214070 | 8/1989 | United Kingdom . |

Primary Examiner—William J. Van Balen
Attorney, Agent, or Firm—Weiser & Stapler

[57] ABSTRACT

A skin covered foamed plastic article capable of providing improved softness, feel and comfortableness by reducing the amount of penetration of the liquid foam resin into the skin cover with a thin wadding. The article includes a wadding to be attached on a back side of the surface skin and to make a direct contact with the pad member, having a soft layer contacting the surface skin and a hard layer contacting the pad member which has a constant thickness and is made to be harder than both the soft layer and the pad member.

9 Claims, 1 Drawing Sheet

SKIN COVERED FOAMED PLASTIC ARTICLE

BACKGROUND OF THE INVENTION

1. Field of the Invention

The present invention relates to a skin covered foamed plastic article, to be used, for example, for car seat cushions and seat backs.

2. Description of the Background Art

The skin covered foamed plastic articles have been used for car seat cushions and seat backs. As shown in FIG. 1, such a skin covered foamed plastic article 1 is conventionally made of a pad member 3 covered by a skin cover 2. The pad member 3 and the skin cover 2 were used to be manufactured separately and combined together later, but it has become fashionable to manufacture an entire skin covered foamed plastic article 1 as a skin covered pad member at once by making the foamed plastic inside the skin cover 2 placed over a molding surface, so that the process of combining at later time may be omitted for the sake of efficiency of the manufacturing process.

This is usually done by placing a skin cover 2 over a lower mold and assembling the lower mold with an upper mold such that edges of the skin cover 2 is pinched between parting lines between the upper mold and the lower mold, and then pouring liquid foam resin into a space between the upper mold and the lower mold which will become a pad member 3 covered with the skin cover 2 after the foaming process.

The skin cover 2 is often made of a surface skin 2a such as a cloth or vinyl chloride leather, on back of which a wadding 2b made of such material as slab urethane is attached.

The surface skin 2a and the wadding 2b of the skin cover 2 is attached by applying adhesive on one of their mutually facing sides, or is flame laminated by melting a surface of the wadding 2b by a flame treatment.

However, the conventional skin covered foamed plastic article has the following problems.

First, in a case the pad member 3 is separately pre-manufactured and this pad member 3 is covered by the skin cover 2 later, the manufacturing process becomes cumbersome, togetherness of the skin cover 2 and the pad member 3 is lost, the softness of the skin covered foamed plastic article 1 is obtained only from the softness of the pad member 3, and the deflection curve of the skin covered foamed plastic article 1 is fixed, so that it has been impossible to improve the comfortableness of a sitter.

Also, when the skin cover 2 comprising a surface skin 2a on a front side and a wadding 2b attached on a back side of the surface skin 2a is placed on the lower mold and liquid foam resin is poured inside the skin cover 2, the liquid foam resin penetrated into the wadding 2b on the back side of the skin cover 2 irregularly to form a penetrated portion 5, which worsened a feel of the skin cover 2 enormously. Namely, in pouring the liquid foam resin, pouring pressure and foaming pressure are exerted strongly on a part of the wadding 2b, so that the penetrated portion 5 is formed at this part, or a penetrated layer of irregular thickness is formed, which made the softness of the skin covered foamed plastic article 1 irregular and worsened the feel and comfortableness of the skin covered foamed plastic article 1.

Furthermore, the penetrated layer 5 is not formed uniformly such that there appears portions where the amount of penetration is large, and in such portions where the amount of penetration is large there has been a problem that the penetration could reach the surface skin 2a so that the liquid foam resin leaks from and damages the surface skin 2a. For this reason, the thickness of the wadding 2b cannot be made thinner.

In addition, the conventional skin cover 2 has not matched well with the foaming mold, so that when the skin cover 2 is place on the foaming mold, the skin cover 2 does not fit tightly on the foaming mold, which made the process of placing difficult, and the skin cover 2 may develop wrinkles as it is place on the foaming mold.

Moreover, in attaching the surface skin 2a and the wadding 2b of the skin cover 2, the application of adhesive is uneconomical as the adhesive is expensive. On the other hand, for the flame laminated case, the surface skin 2a and the wadding 2b do not stick together when the melting is insufficient, or the wadding 2b stiffens when the melting is excessive so that the matching with the foaming mold worsens, the wrinkles appear, and a feel is hardened.

SUMMARY OF THE INVENTION

It is therefore an object of the present invention to provide a skin covered foamed plastic article which has a superior softness, in which the softness is varied in a direction of depth of the pad member and the wadding, and which can improve the feel and the comfortableness of the sitter.

It is also an object of the present invention to provide a skin covered foamed plastic article having a skin cover which is capable of improving the feel of the skin cover and reducing the amount of penetration of the liquid foam resin into the wadding such that even with a thin wadding the leakage of the liquid foam resin to the front side of the surface skin and the damaging of the skin cover can be prevented, and which matches well with the foaming mold so that it can be made to fit tightly to the foaming mold without producing wrinkles and can be manufactured by flame lamination without using adhesive so that it is economical and the attachment can be strong without destroying materials of the skin cover and the wadding.

According to one aspect of the present invention there is provided a skin covered foamed plastic article, comprising: a pad member; and a skin cover to cover the pad member, including: a surface skin to be an outer surface of the skin covered foamed plastic article; and a wadding to be attached on a back side of the surface skin and to make a direct contact with the pad member, having a soft layer contacting the surface skin and a hard layer contacting the pad member which has a constant thickness and is made to be harder than both the soft layer and the pad member.

According to another aspect of the present invention there is provided a skin covered foamed plastic article, comprising: a pad member; and a skin cover to cover the pad member, including: a surface skin to be an outer surface of the skin covered foamed plastic article; and a wadding to be attached on a back side of the surface skin and to make a direct contact with the pad member, having an air permeability of not greater than 120 cc/cm$^2$/sec, a density of 20 to 35 kg/m$^3$, and a cell number of 40 to 50/25 mm.

According to another aspect of the present invention there is provided a skin covered foamed plastic article, comprising: a pad member; and a skin cover to cover the pad member, including: a surface skin to be an outer surface of the skin covered foamed plastic article; and a wadding to be attached on a back side of the surface skin and to make a direct contact with the pad member, being flame laminated to the surface skin with a surface facing the surface skin being melted for not less than 0.3 mm and less than 0.8 mm thickness.

Other features and advantages of the present invention will become apparent from the following description taken in conjunction with the accompanying drawings.

DETAILED DESCRIPTION OF THE PREFERRED EMBODIMENTS

Figure 1:
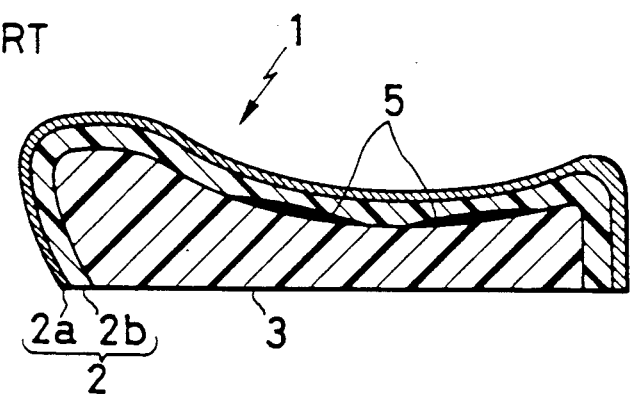
FIG. 1 is a cross sectional view of a part of a conventional skin covered foamed plastic article.
Figure 2:
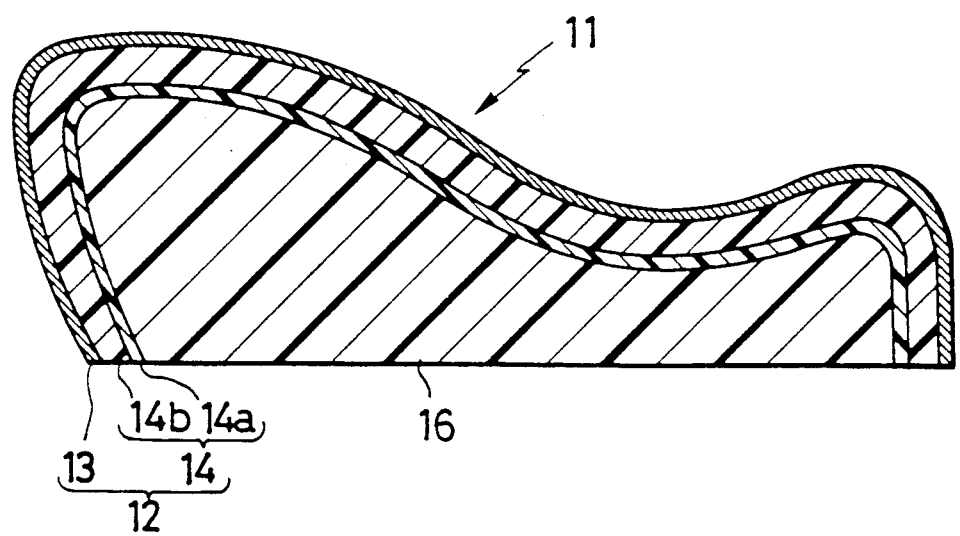
FIG. 2 is a cross sectional view of a part of one embodiment of a skin covered foamed plastic article according to the present invention.

Referring now to FIG. 2, there is shown one embodiment of a skin covered foamed plastic article according to the present invention.

In this embodiment, a skin covered foamed plastic article 11 comprises a skin cover 12 and a pad member 16.

The skin covered foamed plastic article 11 is formed by placing the skin cover 12 on a foaming mold (not shown), pouring the liquid foam resin, and forming the pad member 16 together with the skin cover 12 in the foaming process.

Figure 3:
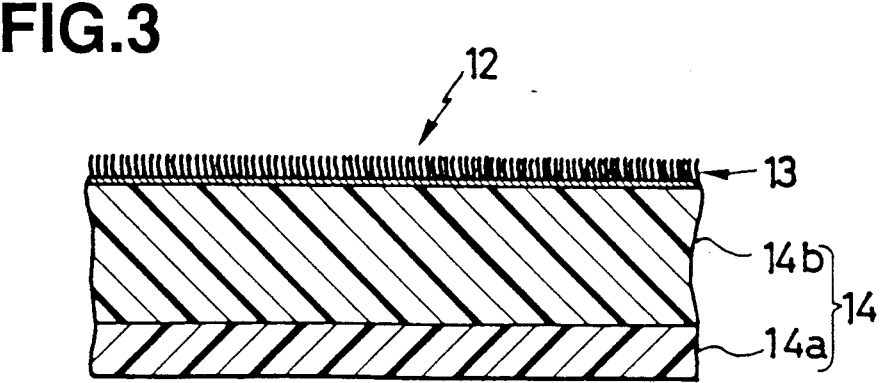
FIG. 3 is a cross sectional view of a part of a skin cover for the skin covered foamed plastic article of FIG. 2.

As shown in FIG. 3, the skin cover 12 of this skin covered foamed plastic article 11 includes a surface skin 13 on a front side, which has a short brushes like surface, and a wadding 14 made of such material as slab-urethane, foamed plastic sheet, or thermoplastic resin sheet which is attached on a back side of the surface skin 13. On the back side of the wadding 14, a hard layer 14a into which the liquid foam resin is uniformly penetrated is formed, while on the front side of the wadding 14, a soft layer 14b into which the liquid foam resin is not penetrated is formed. The hard layer 14a is made to be harder than both the pad member 16 and the soft layer 14b.

Here, as a method of making the hard layer 14a and the soft layer 14b on the wadding 14 uniformly, the hard layer 14a may be prepared by applying the liquid foam resin uniformly to the wadding 14 of the skin cover 12 beforehand by spraying or by other ways. Also, the hard layer 14a may be formed as a uniform penetrated layer obtained by placing the skin cover on the foaming mold, placing this foaming mold in a prescribed pressure control room, and controlling the pressure inside the foaming mold when pouring the liquid foam resin. The thickness of this hard layer 14a is preferably be in a range of 1 to 5 mm.

The wadding 14 as a whole has a thickness in a range of 3 to 15 mm within which the thickness is suitably varied for different parts of the skin covered foamed plastic article 11, such as, for instance, 10 mm for a main portion and 5 mm for a side portion of a seat cushion when the skin covered foamed plastic article 11 is to be used as a seat cushion or a seat back.

In addition, the wadding 14 of this embodiment is made to have the air permeability of not greater than 120 cc/cm$^2$/sec, the density of 20 to 35 kg/m$^3$, and the cell number of 40 to 50/25 mm. For a comparison, a conventional wadding has the large air permeability of 150 to 250 cc/cm$^2$/sec, and the small cell number of 35 to 40/25 mm. The density of 20 to 35 kg/m$^3$ is the same for both.

With the skin cover 12 of this embodiment having such properties placed on a foaming mold (not shown) and the liquid foam resin is poured inside the wadding 14, an extremely desirable result of the penetrated layer with no more than 1 to 3 mm thickness had been obtained.

The surface skin 13 and the wadding 14 of the skin cover 12 are flame laminated with a surface of the wadding 14 facing the surface skin 13 being melted for not less than 0.3 mm and less than 0.8 mm thickness, or more preferably 0.5 mm thickness. When the surface skin 13 and the wadding 14 are flame laminated with 0.5 mm thickness, the strength against exfoliation is 0.4 kg/25 mm, which is very large. In contrast, when the surface skin 13 and the wadding 14 are flame laminated with less than 0.3 mm thickness, such as 0.1 mm for instance, the strength against exfoliation is 0.05 kg/25 mm so that the surface skin 13 and the wadding 14 can easily come off, whereas when the surface skin 13 and the wadding 14 are flame laminated with more than 0.8 mm thickness, the surface of the wadding 14 stiffens so that the matching with the foaming mold worsens, the wrinkles appear on the surface skin 13, and a feel of the skin covered foamed plastic article 11 is hardened.

Thus, according to this embodiment, the liquid foam resin is made to penetrate into the back side of the wadding 14 by a constant thickness to form the hard layer 14a, while the soft layer 14b is formed on the front side of the wadding 14 into which the liquid foam resin is not penetrated so that it is possible to obtain a skin covered foamed plastic article in which the feel and the comfortableness can be improved, and the efficiency of manufacturing process can be improved as it is formed together at once.

Furthermore, the wadding 14 is made to have the small air permeability of not greater than 120 cc/cm$^2$/sec, the density of 20 to 35 kg/m$^3$, and the large cell number of 40 to 50/25 mm, so that the amount of penetration of the liquid foam resin can be reduced drastically. This, in turn, makes it possible for the wadding 14 to be made thinner than usual without resulting in the leakage of the liquid foam resin from the surface skin 13 and damaging of the skin cover 12, so that the skin covered foamed plastic article 11 of superior appearance and feel can be obtained.

Moreover, the surface skin 13 and the wadding 14 of the skin cover 12 are flame laminated with the surface of the wadding 14 being melted for not less than 0.3 mm and less than 0.8 mm thickness, or more preferably 0.5 mm thickness, This enable the attachment of the surface skin 13 and the wadding 14 to be sufficiently strong, the feel of the skin covered foamed plastic article 11 to be superior, the manufacturing of the skin covered foamed plastic article 11 to be economical, and makes it possible to obtain the skin covered foamed plastic article 11 which can match well with the foaming mold, which does not produce wrinkles, and which has superior appearance and feel.

The superiority of the skin covered foamed plastic article according to the present invention over the conventional skin covered foamed plastic article has been checked by measuring the distribution of the pressure exerted on the sitter by various parts of the skin covered foamed plastic article, which showed that the distribution become much less irregular with the skin covered foamed plastic article according to the present invention. This implies that the sitter will feel more uniformly distributed bounces from the seat made of the skin covered foamed plastic article according to the present invention. Thus, the more comfortable seating can be provided by the present invention.

It is to be noted that many modifications and variations of the above embodiment may be made without departing from the novel and advantageous features of the present invention. Accordingly, all such modifications and variations are intended to be included within the scope of the appended claims.

What is claimed is:

1. A skin covered foamed plastic article, comprising:
a pad member; and
a skin cover covering the pad member, including:
   a surface skin forming an outer surface of the skin covered foamed plastic article; and
   a wadding attached on a back side of the surface skin, making a direct contact with the pad member, and having a soft layer contacting the surface skin and a hard layer contacting the pad member which has a constant thickness and which is harder than both the soft layer and the pad member.

2. The skin covered foamed plastic article of claim 1, wherein the hard layer is harder than both the soft layer and the pad member by a uniform penetration into the hard layer of liquid foam resin which stiffens in a foaming process.

3. The skin covered foamed plastic article of claim 1, wherein a thickness of the hard layer is in a range of 1 to 5 mm.

4. The skin covered foamed plastic article of claim 1, wherein the wadding has an air permeability of not greater than 120 cc/cm$^2$/sec, and a cell number of 40 to 50/25 mm.

5. The skin covered foamed plastic article of claim 1, wherein the surface skin and the wadding of the skin cover are flame laminated with a surface of the wadding facing the surface skin being melted for not less than 0.3 mm and less than 0.8 mm thickness.

6. The skin covered foamed plastic article of claim 5, wherein the surface skin and the wadding of the skin cover are flame laminated with a surface of the wadding facing the surface skin being melted for 0.5 mm thickness.

7. A skin covered foamed plastic article, comprising:
a pad member; and
a skin cover covering the pad member, including:
   a surface skin forming an outer surface of the skin covered foamed plastic article; and
   a wadding attached on a back side of the surface skin, making a direct contact with the pad member, and having an air permeability of not greater than 120 cc/cm$^2$/sec, a density of 20 to 35 kg/m$^3$, and a cell number of 40 to 50/25 mm.

8. A skin covered foamed plastic article, comprising:
a pad member; and
a skin cover covering the pad member, including:
   a surface skin forming an outer surface of the skin covered foamed plastic article; and
   a wadding attached on a back side of the surface skin, making a direct contact with the pad member, and flame laminated to the surface skin, wherein the surface of the wadding facing the surface skin is melted to a depth not less than 0.3 mm and less than 0.8 mm.

9. The skin covered foamed plastic article of claim 8, wherein the surface skin and the wadding of the skin cover are flame laminated with a surface of the wadding facing the surface skin being melted for 0.5 mm thickness.

* * * * *